(12) United States Patent
Horton

(10) Patent No.: US 9,039,022 B2
(45) Date of Patent: May 26, 2015

(54) RECONFIGURABLE FIXED SUSPENSION SEMI-TRAILER, FLATBED OR CHASSIS

(75) Inventor: Robert Horton, Kingwood, TX (US)

(73) Assignee: Texas Trailer Partners LLC, Kingwood, TX (US)

( * ) Notice: Subject to any disclaimer, the term of this patent is extended or adjusted under 35 U.S.C. 154(b) by 0 days.

(21) Appl. No.: 13/064,604

(22) Filed: Apr. 4, 2011

(65) Prior Publication Data

US 2012/0248728 A1   Oct. 4, 2012

(51) Int. Cl.
*B62D 53/06* (2006.01)

(52) U.S. Cl.
CPC .............. *B62D 53/068* (2013.01); *B62D 53/06* (2013.01)

(58) Field of Classification Search
CPC ..... B62D 53/068; B62D 21/14; B62D 63/061
USPC ............ 280/149.2, 407.1, 656, 638; 180/209; 296/26.09, 26.08; 414/477, 478, 479
See application file for complete search history.

(56) References Cited

U.S. PATENT DOCUMENTS

| | | | | | |
|---|---|---|---|---|---|
| 2,676,815 | A | * | 4/1954 | Bennett | 280/81.1 |
| 2,682,419 | A | * | 6/1954 | Wolf | 280/407.1 |
| 3,812,791 | A | * | 5/1974 | Barnard | 410/44 |
| 4,111,451 | A | * | 9/1978 | Pinto | 280/408 |
| 4,353,565 | A | * | 10/1982 | Smith et al. | 280/149.2 |
| 5,035,439 | A | * | 7/1991 | Petrillo | 280/81.6 |
| 6,435,536 | B2 | * | 8/2002 | Eckelberry | 280/407.1 |
| 6,834,874 | B1 | * | 12/2004 | Overby | 280/124.116 |
| 2006/0181063 | A1 | * | 8/2006 | Eddings | 280/656 |

* cited by examiner

*Primary Examiner* — Keith Frisby
(74) *Attorney, Agent, or Firm* — Juan Carlos A. Marquez; Bacon & Thomas

(57) ABSTRACT

A reconfigurable fixed position suspension and support structure attached to the trailer body using a locking device consisting of pins, bolts and/or other fastening devices. The support structure has a removable locking device that when attached to the support structure locks the support structure and suspension into a fixed position relative to the trailer body. When the trailer is not in operation, the locking device can be removed allowing the suspension group to be reconfigured, and each suspension to be repositioned relative to the trailer body. The removable locking device is then reattached to the suspension support structure locking the support structure and suspension into a new fixed position relative to the trailer body.

10 Claims, 9 Drawing Sheets

RECONFIGURABLE FIXED SUSPENSION SEMI-TRAILER, FLATBED OR CHASSIS

TECHNICAL FIELD

Exemplary embodiments of the present invention relate to semi-trailer, flatbed or chassis suspension systems. More specifically, exemplary embodiments relate to suspension systems where the suspension is in a fixed position relative to the trailer body and where the suspension position can not be changed during operation.

BACKGROUND OF THE INVENTION

Semi-trailers, flatbed trailers and chassis typically have a suspension that is considered to be either a fixed suspension or a sliding suspension. Fixed suspensions are typically attached to the trailer body in such a way that their position relative to the trailer body is considered a permanent configuration. Fixed suspensions are typically attached to the trailer body by welding or bolting the suspension rigidly into place. Sliding suspensions are typically attached to the trailer body in such a way that their position relative to the trailer body can be changed during operation. Sliding suspensions are typically attached to the trailer body using movable sub-frames commonly referred to as sliders. Sliding suspensions typically have a retractable pin mechanism that enables selective positioning of the slider relative to the trailer body during vehicle operation.

A prior art slider for a semi-trailer is indicated generally at 20 and is shown in FIG. 1. Slider 20 is movably mounted on trailer body 40 (FIGS. 3-4) by slidable engagement of rail guides to the trailer body main rails.

A prior art fixed suspension is shown in FIGS. 5-6. A typical fixed suspension is attached to the trailer body in fixed locations in such a way as dimensions A and B in FIG. 5 can not be changed.

SUMMARY OF THE INVENTION

Exemplary embodiments of the present invention are directed to a removable suspension support structure that is selectively positioned and secured to the trailer body with removable pins. The pin assembly engages openings in the trailer body and is secured to the support structure with bolts. The suspension support structure comprises two longitudinal members that engage the lower flanges of the trailer body main beam rails. The two longitudinal members are connected to each other in a spaced-apart parallel relationship by crossmembers which extend between the main members.

The above-described and other features and advantages of the present disclosure will be better appreciated and understood by those skilled in the art with reference to the following detailed description, drawings, and appended claims. Additional features and advantages are realized through the techniques of the present invention. Other embodiments and aspects of the invention are described in detail herein and are considered a part of the claimed invention.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

Figure 1:
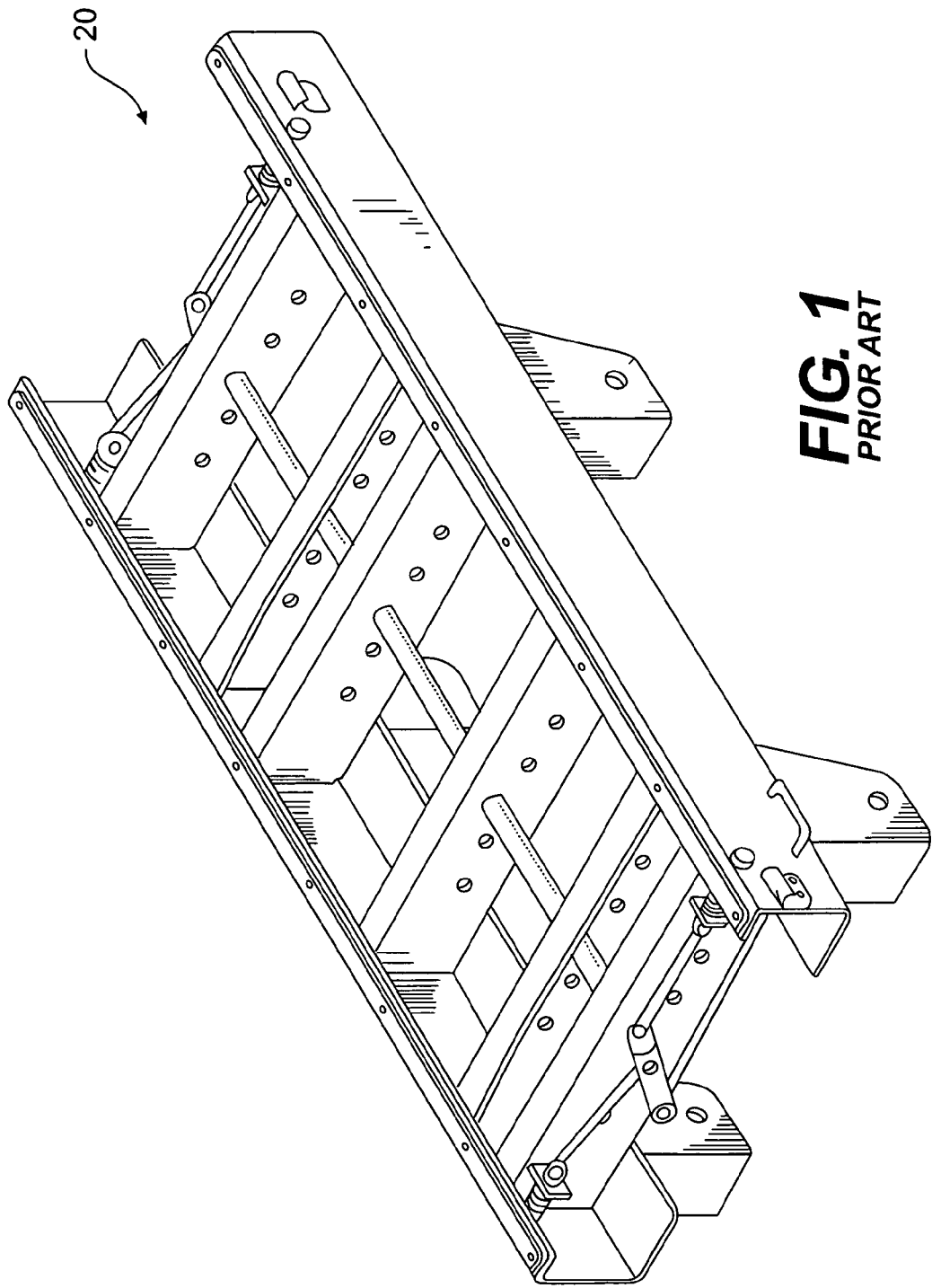
FIG. 1 is a perspective view of a conventional prior art slider for a semi-trailer having a plurality of transversely extending parallel cross members, showing the retractable pin mechanism used to selectively locate the slider along the underside of a trailer while the trailer is in operation.
Figure 2:
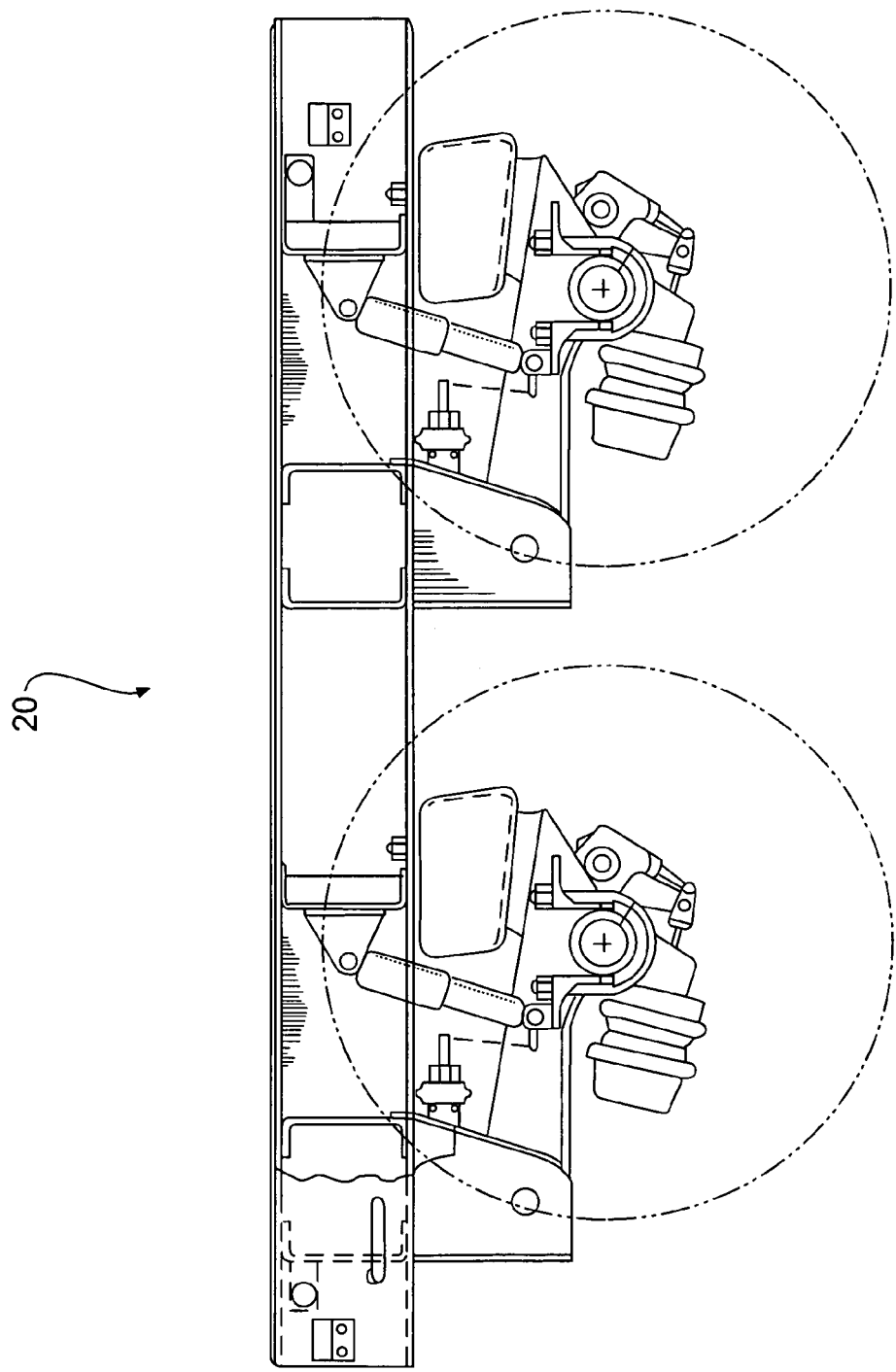
FIG. 2 is a fragmentary elevational view of the prior art slider illustrated in FIG. 1, but showing the axle/suspension systems, with the wheels/tires and hidden parts represented by broken lines.
Figure 3:
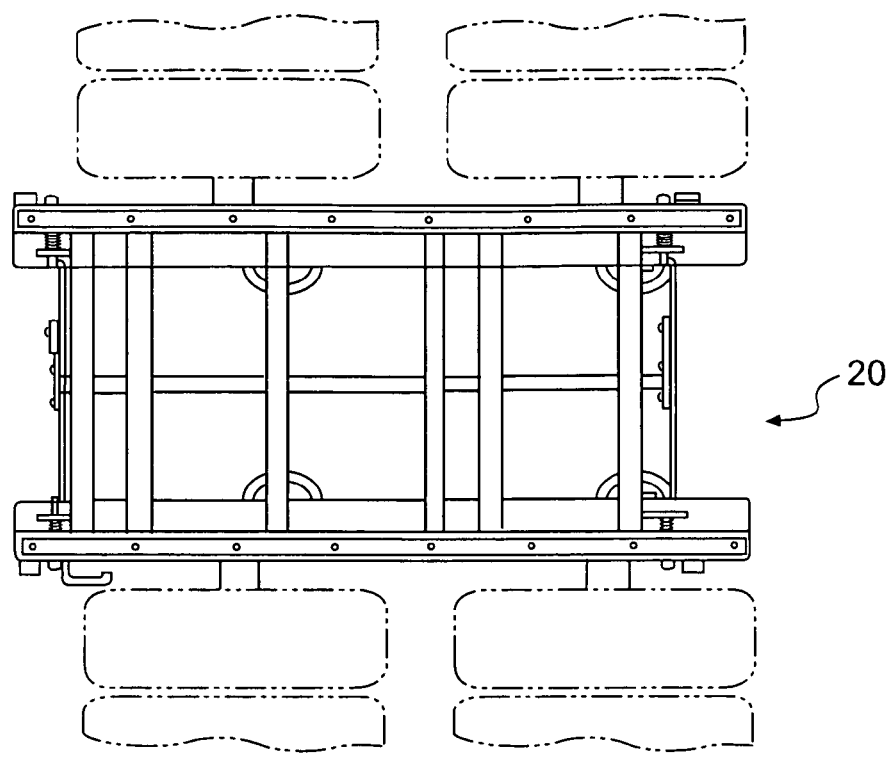
FIG. 3 is a reduced-size fragmentary top plan view of the prior art slider shown in FIG. 2.
Figure 4:
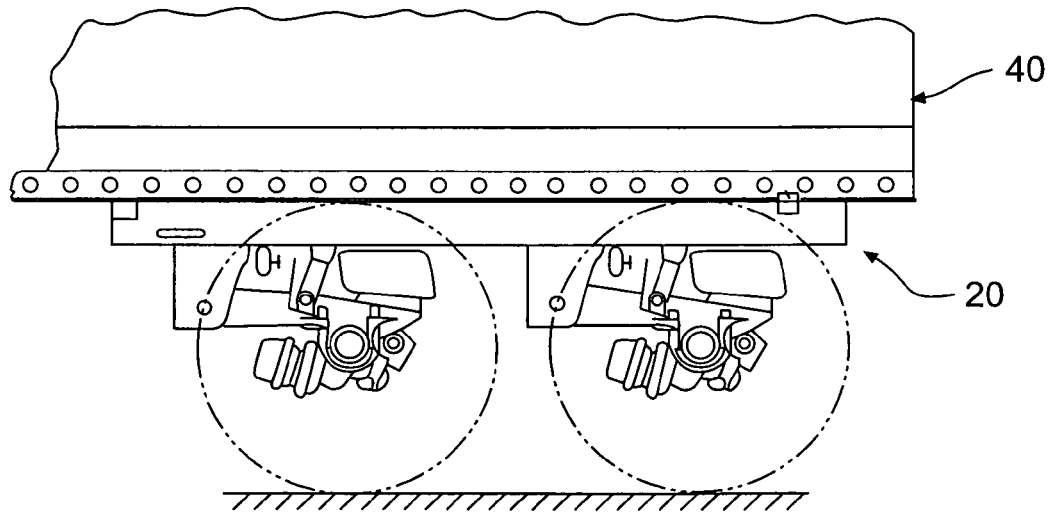
FIG. 4 is a fragmentary elevational view, showing the prior art slider of FIG. 3 movably mounted on the underside of a trailer body.
Figure 5:
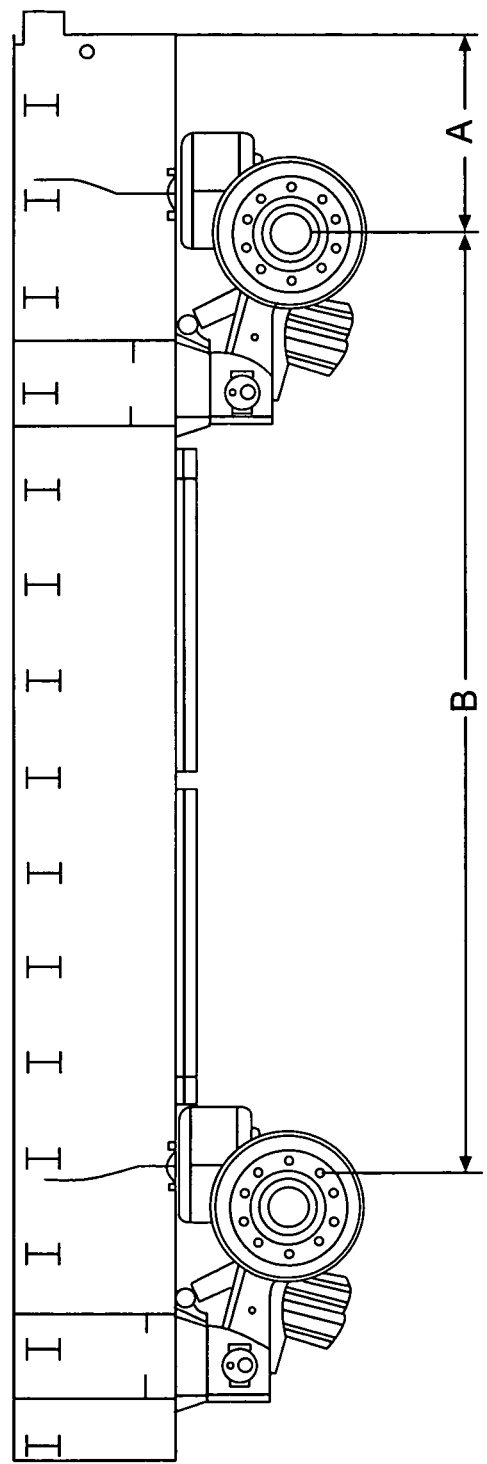
FIG. 5 is a fragmentary elevational view of a prior art fixed suspension installation showing the crossmembers and gussets required for support.
Figure 6:
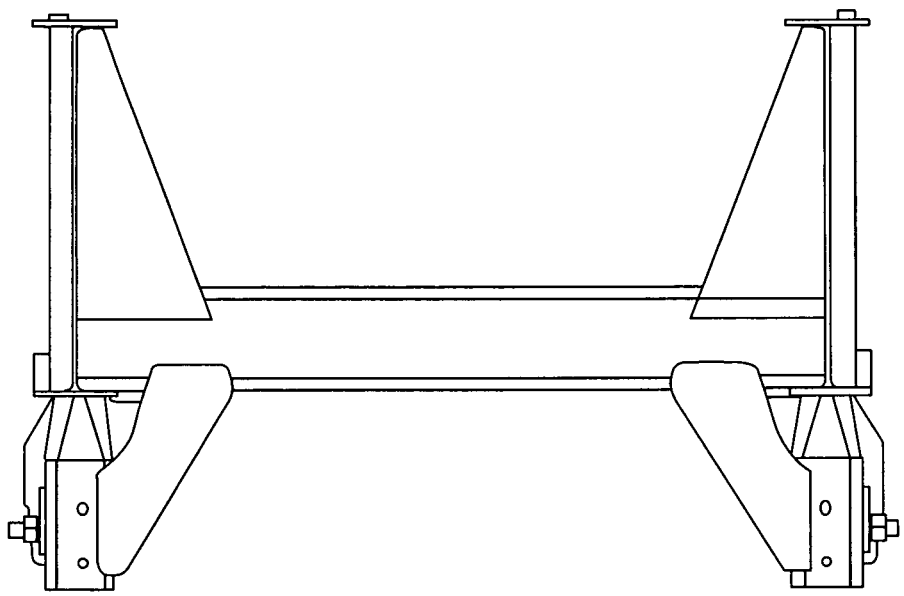
FIG. 6 is a fragmentary front end view of the prior art fixed suspension shown in FIG. 5 with the axle systems removed for clarity.

The detailed description explains exemplary embodiments of the present invention, together with advantages and features, by way of example with reference to the drawings, in which similar numbers refer to similar parts throughout the drawings. The diagrams depicted herein are just examples to be regarded as illustrative in nature and not as restrictive. There may be many variations to these diagrams described therein without departing from the spirit of the invention. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form, and it will be apparent to those skilled in the art that the present invention may be practiced without these specific details. Further, the terms and phrases used herein are not intended to be limiting but rather to provide an understandable description of the invention.

Exemplary embodiments of a removable suspension support structure in accordance with the present invention will now be described with reference to the drawings. Exemplary embodiments of the present invention may be implemented to provide a more cost effective solution to replacing and/or adding a fixed position suspension to a new or previously used semi-trailer, flatbed or chassis. Exemplary embodiments may also be implemented to provide a more cost effective solution to adding an additional fixed position suspension, referred to as a third axle, to a trailer initially configured in a widespread or closed tandem arrangement.

More particularly, exemplary embodiments of the present invention can be implemented to provide a fixed position suspension and support structure that is secured to the trailer in such a way as to allow the suspension and/or support structure to be configured and/or reconfigured in selective positions relative to the trailer body and/or other fixed, movable or sliding suspensions. For instance, such a fixed position suspension and support structure assembly can, in exemplary embodiments, be secured to the trailer with a locking device that locks the assembly into a fixed position relative to the trailer body. When the trailer is not in operation, each suspension support structure assembly can be detached from the trailer body, repositioned relative to the trailer body, and reattached to the trailer body in a different fixed position relative to the trailer body.

Figure 7:
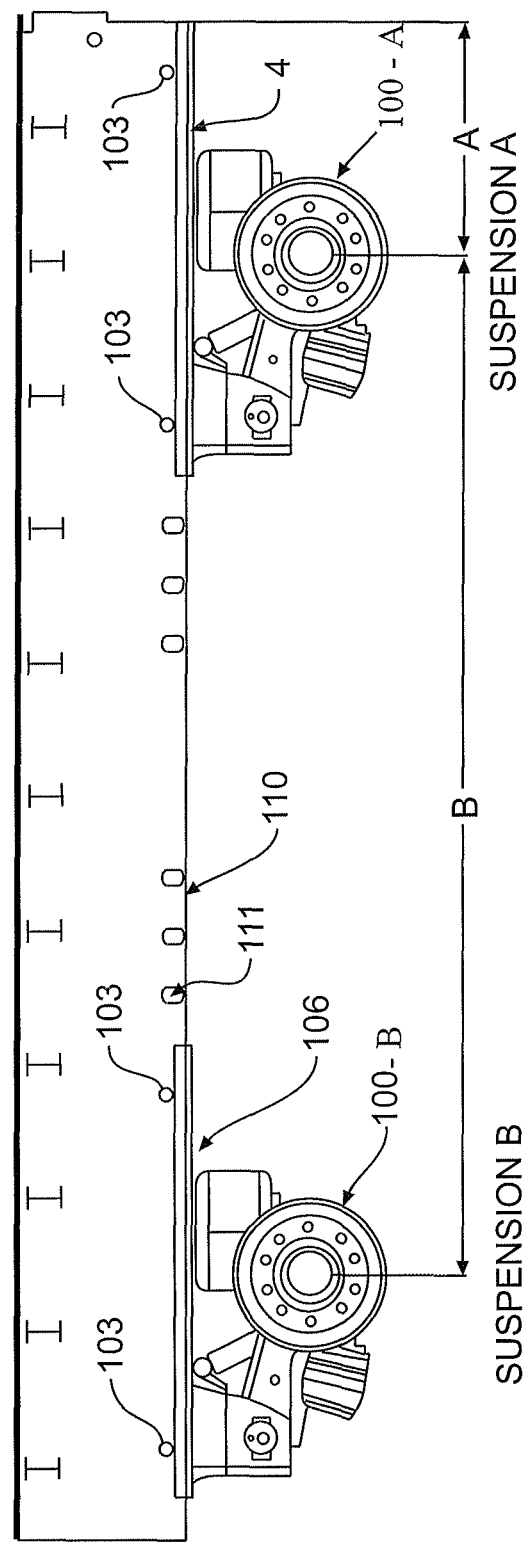
FIG. 7 is a fragmentary elevational view of an exemplary embodiment of the present invention in which two separate suspensions are mounted in a wide spread configuration.
Figure 8:
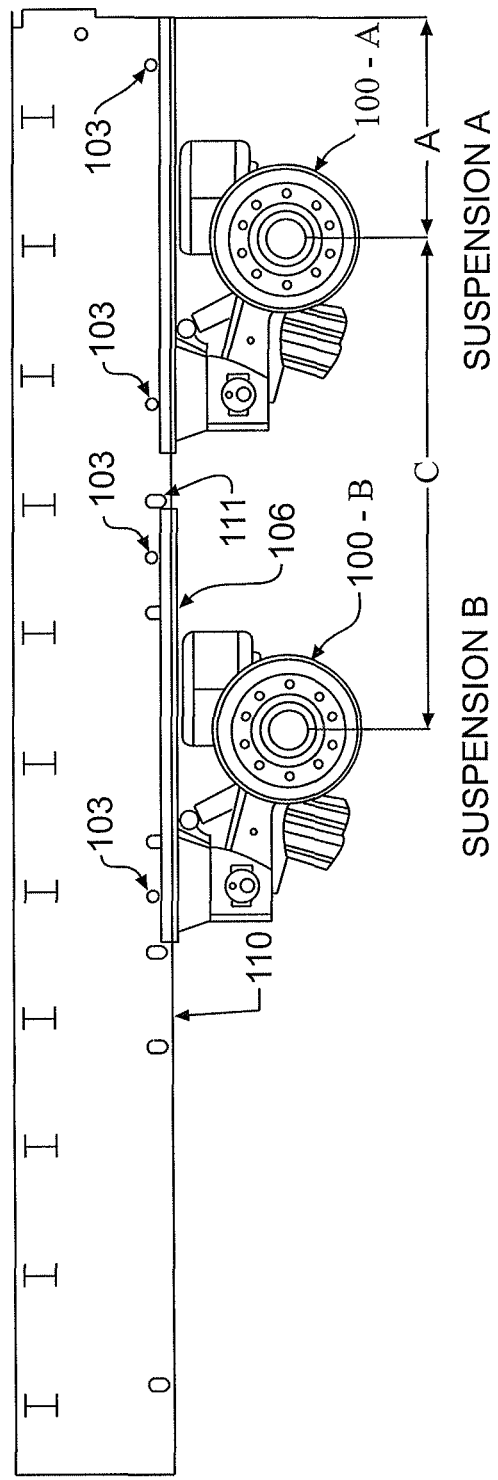
FIG. 8 is a fragmentary elevational view of an exemplary embodiment of the present invention in which two separate suspensions are mounted in a closed tandem configuration.

A first exemplary embodiment of the present invention is shown in FIGS. 7-11. In FIG. 7 a widespread configuration is shown where suspension 100-A is fixed at a distance A from the rear of the trailer body and suspension 100-B is fixed at a distance B from suspension 100-A. FIG. 8 shows the same suspension group after suspension 100-B has been removed, reconfigured and fixed at a distance C from suspension 100-A. Each suspension is fixed in position by pins 103 that engage the longitudinal members 106 of the suspension support structure, pin support 102, and the trailer body web 111. The longitudinal members 106 of the support structure also engage the trailer body lower beam flanges 110 to provide latitudinal support.

Figure 9:
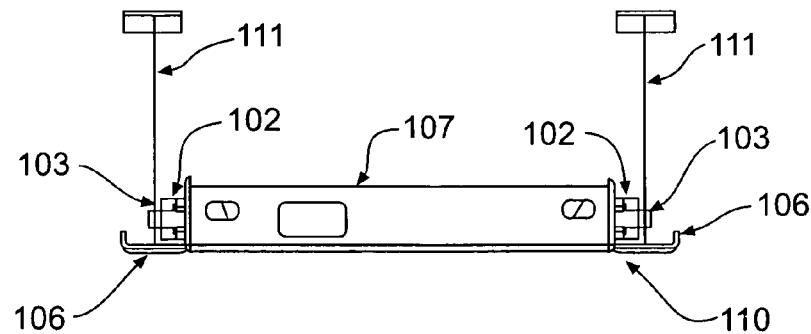
FIG. 9 is a close-up front end view of longitudinal members of exemplary support structures shown attached to the main beams of a trailer body.
Figure 10:
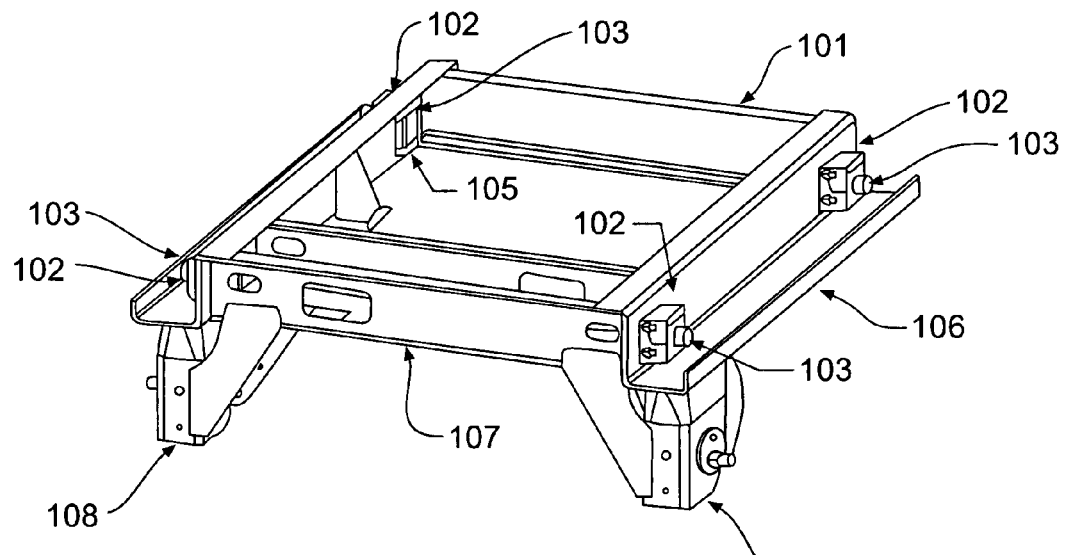
FIG. 10 is a perspective view of the exemplary support structure of FIG. 9 in which a pin assembly and pin supports assembled and a set of exemplary suspension hangers are attached to the exemplary support structure.
Figure 11:
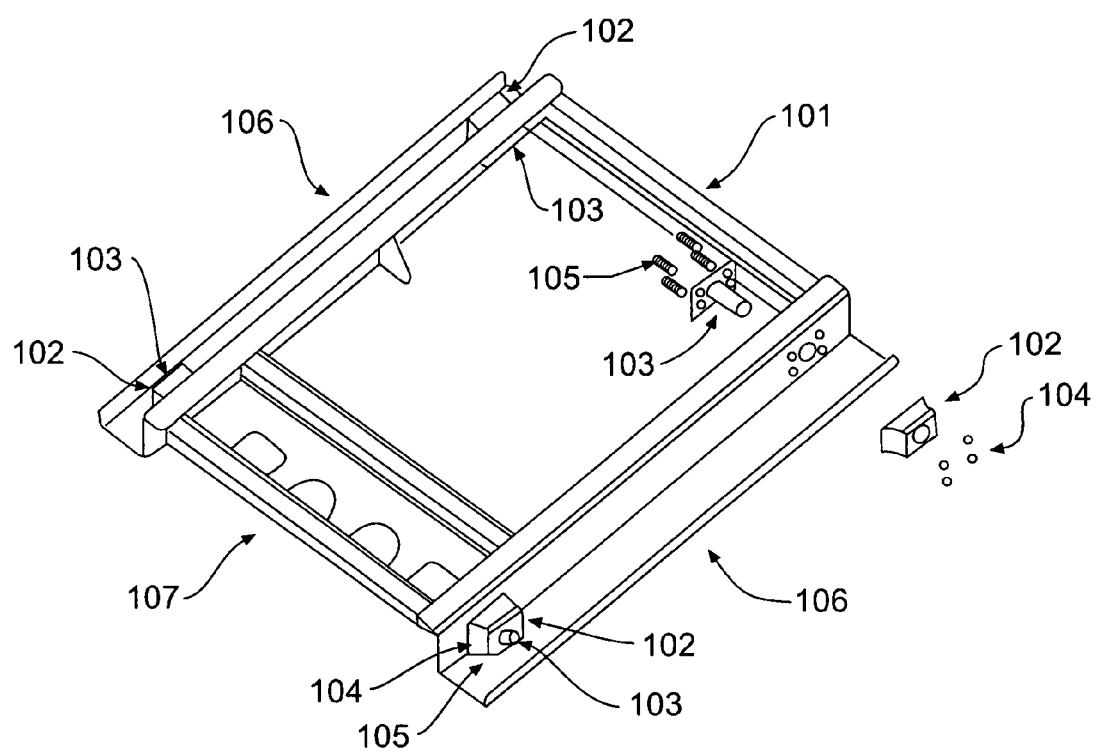
FIG. 11 is a perspective view of the present invention showing an exploded view of the exemplary support structure of FIG. 10.

The two longitudinal members 106 of the support structure are connected in a spaced apart parallel relationship by support structure crossmembers 107 and 101 which extend between and are perpendicular to the two longitudinal members 106 (FIGS. 9-11). Crossmembers 107 and 101 are secured to longitudinal members 106 by means of welding or mechanical fastening.

Suspension hangers 108 depend from the support structure assembly to allow a suspension trailing arm and axle assembly to be mounted to each support structure assembly and are secured to the support structure longitudinal members 106 and the support structure crossmember 107 by welding and/or mechanical fastening.

Each pin assembly 103 is secured to a support structure longitudinal member 106 with four mechanical fasteners 105, 104. The four mechanical fasteners 105,104 also align the pin support 102 with the pin assembly 103 and secure the pin support to the longitudinal member 106.

In the present exemplary embodiment to provide a fixed installation of the suspension support structure assembly, the support structure assembly is selectively positioned on the trailer body. Each pin assembly 103 is aligned with the respective holes in the longitudinal member 106, pin support 102 and trailer body web 111. Four mechanical fasteners 105,104 are then used to secure each pin assembly 103 and pin support 102 to the longitudinal members 106. After installation of the mechanical fasteners 105,104 the position of the suspension and suspension support structure is fixed relative to the trailer body.

When requirements change, the trailer can be taken out of service and the mechanical fasteners 105,104 removed allowing the pin assembly 103 and pin support 102 to be removed. The suspension support structure and suspension can then be reconfigured and repositioned relative to the trailer body. Each pin assembly 103 is then re-aligned with its respective hole in the longitudinal member 106, the pin support 102 and a new hole location in the trailer body web 111. Four mechanical fasteners 105,104 are then used to secure each pin assembly 103 and pin support 102 to the longitudinal members 106. After installation of the mechanical fasteners 105, 104 the position of the suspension and suspension support structure is fixed relative to the trailer body.

While the invention has been described in detail with reference to exemplary embodiments, it will be understood by those skilled in the art that various changes and alternations may be made and equivalents may be substituted for elements thereof without departing from the scope of the invention as defined by the appended claims. In addition, many modifications may be made to adapt a particular application or material to the teachings of the invention without departing from the essential scope thereof.

Variations described for exemplary embodiments of the present invention can be realized in any combination desirable for each particular application. Thus particular limitations, and/or embodiment enhancements described herein, which may have particular limitations need be implemented in methods, systems, and/or apparatuses including one or more concepts described with relation to exemplary embodiments of the present invention.

Therefore, it is intended that the invention not be limited to the particular embodiments disclosed as the best mode contemplated for carrying out this invention, but that the invention will include all embodiments falling within the scope of the present application as set forth in the following claims, wherein reference to an element in the singular, such as by use of the article "a" or "an" is not intended to mean "one and only one" unless specifically so stated, but rather "one or more." Moreover, no claim element is to be construed under the provisions of 35 U.S.C. §112, sixth paragraph, unless the element is expressly recited using the phrase "means for" or "step for." These following claims should be construed to maintain the proper protection for the present invention.

What is claimed is:

1. A suspension support apparatus for a chassis structure of a tractor vehicle, the chassis structure of the tractor vehicle having first and second longitudinally-extending and laterally spaced-apart beam structures, the first and second longitudinally-extending and laterally spaced-apart beam structures each having a plurality of engagement locations, the suspension support apparatus comprising:

first and second longitudinally-extending and laterally spaced-apart ribs configured to be selectively positioned and aligned with any of the plurality of engagement locations formed on the first and second longitudinally-extending and laterally spaced-apart beam structures, each of the first and second ribs being L-shaped in cross-section and each having a first vertical surface, a second vertical surface on an opposite side of the rib from the first surface and a third horizontal surface, the first surface of the first rib and the first surface of the second rib facing each other and the second surface of the first rib and the second surface of the second rib facing away from each other, the third horizontal surface of the first and second ribs each defining a channel portion facing away from each other, each of the first and second beam structures being I-beam shaped in cross-section and each having at least a first vertical side, a second vertical side opposite the first side and a third horizontal side, the first side of the first beam structure and the first side of the second beam structure facing each other and the second side of the first beam structure and the second side of the second beam structure facing away from each other, the third horizontal sides of the first and second beam structures being positionable in the corresponding channel portions of the third surfaces of the first and second ribs such that the first and second ribs are slidably movable along the first and second beam structures;

a single axle member and suspension fixedly connected between the first and second ribs; and a plurality of fasteners configured to be removably attached to the second surfaces of the first and second ribs and to removably secure the first and second ribs to the corresponding first and second beam structures in a first releasable attachment in which the second surfaces of the first and second ribs are in a mutual facing relationship with the first sides of the corresponding first and second beam structures, respectively, with the plurality of fasteners removably connected therebetween at any selected engagement location of the plurality of engagement locations, and wherein the plurality of fasteners are configured to, when the tractor vehicle is not in operation, allow for the first and second ribs to be released from the first releasable attachment with the corresponding beam structures at the selected engagement location, repositioned relative to the corresponding beam structures, and secured to the corresponding beam structures in at least a second releasable attachment at any other engagement location of the plurality of engagement locations, and wherein, when the tractor vehicle is not in operation and the first and second ribs are secured to the corresponding beam structures in one of the releasable attachments at any engagement location of the plurality of engagement locations, the suspension support apparatus functions as a fixed position suspension to lock the first and second ribs into a fixed position relative to the corresponding beam structures via the releasable attachment, such that the suspension support apparatus is repositionable along the first and second spaced-apart beam structures to reconfigure the chassis structure between at least one of a wide spread configuration and a closed tandem configuration.

2. The suspension support apparatus of claim 1, wherein each of the plurality of fasteners comprises a locking device configured to releasably secure a respective pin support of the fastener to the corresponding beam structure for a corresponding rib of the first and second ribs using a respective pin or bolt assembly of the fastener when the corresponding rib is positioned at any of the engagement locations.

3. The suspension support apparatus of claim 2, wherein the respective pin support of each fastener is engaged with the second surface of the corresponding rib using a plurality of removable mechanical fasteners when the respective pin support is releasably secured to the corresponding beam structure.

4. The suspension support apparatus of claim 3, wherein the respective pin or bolt assembly of each fastener extends through respective holes in the corresponding rib, the respective pin support of the fastener, and the corresponding beam structure when the respective pin support is releasably secured to the corresponding beam structure.

5. The suspension support apparatus of claim 3, wherein the second surface of the corresponding rib for each fastener is laterally offset from the first side of the corresponding beam structure when the respective pin support of the fastener is releasably secured to the corresponding beam structure.

6. The suspension support apparatus of claim 1, wherein the suspension support apparatus is provided separately from and not integrated with the chassis structure.

7. The suspension support apparatus of claim 6, wherein the chassis structure includes a trailer body and one or more axle members, and wherein the suspension support apparatus is utilized as an additional axle member for the trailer body when attached to the chassis structure.

8. The suspension support apparatus of claim 7, wherein the trailer body is one of a semi-trailer body and a flatbed trailer body.

9. The suspension support apparatus of claim 1, wherein a respective suspension hanger is secured to and depends from each of the first and second ribs, and wherein the respective suspension hangers are configured to mount the single axle member and suspension to the suspension support apparatus.

10. The suspension support apparatus of claim 9, wherein each of the respective suspension hangers is directly secured to a crossmember that connects and extends laterally between the first and second ribs.

* * * * *